US008521576B2

(12) United States Patent
Thomas (10) Patent No.: US 8,521,576 B2
(45) Date of Patent: Aug. 27, 2013

(54) METHOD AND SYSTEM FOR PROVIDING NOTIFICATION OF PUBLICATIONS

(76) Inventor: C. Douglass Thomas, Campbell, CA (US)

( * ) Notice: Subject to any disclaimer, the term of this patent is extended or adjusted under 35 U.S.C. 154(b) by 2529 days.

(21) Appl. No.: 09/969,049

(22) Filed: Oct. 1, 2001

(65) Prior Publication Data

US 2002/0062219 A1 May 23, 2002

Related U.S. Application Data

(60) Provisional application No. 60/238,565, filed on Oct. 7, 2000.

(51) Int. Cl.
*G06Q 10/00* (2012.01)
(52) U.S. Cl.
USPC .................. 705/7.12; 705/7.15; 705/342
(58) Field of Classification Search
USPC ............. 705/1.1, 7.12, 7.15, 342; 709/204, 709/206
See application file for complete search history.

(56) References Cited

U.S. PATENT DOCUMENTS

| | | | |
|---|---|---|---|
| 5,537,586 A * | 7/1996 | Amram et al. ............... | 707/3 |
| 5,649,186 A * | 7/1997 | Ferguson ..................... | 707/10 |
| 5,761,662 A * | 6/1998 | Dasan .......................... | 707/10 |
| 5,794,233 A * | 8/1998 | Rubinstein ................... | 707/4 |
| 5,895,468 A | 4/1999 | Whitmyer, Jr. | |
| 5,987,464 A | 11/1999 | Schneider | |
| 6,049,801 A | 4/2000 | Whitmyer, Jr. | |
| 6,182,078 B1 | 1/2001 | Whitmyer, Jr. | |
| 6,370,535 B1 * | 4/2002 | Shapiro et al. ............... | 707/100 |
| 2002/0091541 A1 | 7/2002 | Lundberg | |

OTHER PUBLICATIONS

Press Release, "MicroPatent Launches Patent Analysis Tools and System Enhancements for Improved Patent Searching," Corporate Intelligence.com of Information Holdings Inc., May 23, 2001, pp. 1-4.
Press Release, "MicroPatent Releases Patent Link Tool & Posts US Files Back to 1836," Corporate Intelligence.com of Information Holdings Inc., Jun. 12, 2001, pp. 1-3.
"New Citation Indicator Tool Available," MicroPatent, downloaded Sep. 8, 2001, pp. 1-2.
"CHI Citation Report," CHI Research, date unknown.
NameGuard Service, Global Domain Name Monitoring and Trademark Monitoring, NameProtect.com, downloaded Sep. 30, 2001, pp. 1-5.
"Derwent Tailor-Made Profiles (Derwent TMPs) Infobase Service," Derwent Information, 2001 (downloaded Sep. 30, 2001), pp. 1-2.
"Patent Research Products Overview," Delphion Inc., 2001 (downloaded Sep. 30, 2001), pp. 1-2.
"Productivity Tools: Saved Searches," Delphion Inc., 2001 (downloaded Sep. 30, 2001), p. 1.
"Delphion Alerts," Delphion Inc., 2001 (downloaded Sep. 30, 2001), pp. 1-2.
"Study Regarding IP.com Defensive Publication Service," Opinion by McDermott, Will & Emery, Sep. 1, 2000, pp. 1-27.
U.S. Appl. No. 10/364,729, filed Feb. 13, 2003.
Office Action for U.S. Appl. No. 10/364,729 dated Apr. 3, 2007.

(Continued)

*Primary Examiner* — Dean T Nguyen (57) ABSTRACT

Improved approaches to notifying others of publications are disclosed. These improved approaches enable notifications to be timely and reliably made. In one embodiment, a notifor requests notification of certain publications be performed in an automated and controlled manner, and then notifications for such certain publications are automatically prepared and electronically transmitted to one or more notifees.

29 Claims, 11 Drawing Sheets

(56) References Cited

OTHER PUBLICATIONS

Notice of Abandonment for U.S. Appl. No. 10/364,729 dated Apr. 7, 2008.
U.S. Appl. No. 11/960,449 filed Dec. 19, 2007.
Office Action for U.S. Appl. No. 11/960,449 dated Dec. 23, 2010.
Office Action for U.S. Appl. No. 11/960,449 dated Jul. 6, 2011.
Final Office Action for U.S. Appl. No. 11/960,449 dated Jan. 27, 2012.
Office Action for U.S. Appl. No. 11/960,449 dated Dec. 20, 2012.

* cited by examiner

METHOD AND SYSTEM FOR PROVIDING NOTIFICATION OF PUBLICATIONS

CROSS REFERENCE TO RELATED APPLICATION

This application claim priority benefit of U.S. Provisional Patent Application No. 60/238,565, filed Oct. 7, 2000, and which is hereby incorporated herein by reference.

BACKGROUND OF THE INVENTION

1. Field of the Invention

The present invention relates to notifications and, more particularly, to methods and systems for notifying persons of certain publications.

2. Description of the Related Art

Today, publications occur frequently and often. As a result, it is difficult to manage and monitor those of the publications that are of interest. Conventionally, key word searches are performed to locate publications of interest. Recently, services have been available to periodically perform searches of publications and notify the requestor of the results (i.e., the matching publications). Such searches are used with trademark searches (i.e., trademark watching), patent searches (i.e., patent watching), or court opinion searches.

Beyond identification of publications through searches, notice of certain publications can have legal ramifications. The notification of others of the existence of these publications is normally performed one-by-one. Often these notifications are letters that are prepared and send by postal or courier mail service or facsimile. Hence, the conventional approaches to notifying others of publications is inefficient and relatively burdensome. Still further, these conventional approaches to providing notifications are often neglected such that no notifications are performed.

Thus, there is a need for improved approaches to notify others of publications.

SUMMARY OF THE INVENTION

Broadly speaking, the invention relates to improved approaches to notifying others of publications. These improved approaches enable notifications to be timely and reliably made. In one embodiment, a notifor requests notification of certain publications be performed in an automated and controlled manner, and then notifications for such certain publications are automatically prepared and electronically transmitted to one or more notifees.

The invention can be implemented in numerous ways, including as a method, system, device, user interface, and computer readable medium. Several embodiments of the invention are discussed below.

As a computer-implemented method for notifying notifees of publications, one embodiment of the invention includes at least the acts of: identifying for a publication matching predetermined notification criteria; identifying an appropriate notifee to be notified of the publication matching predetermined notification criteria; preparing a notification message; and sending the notification message to the appropriate notifee.

As a computer-implemented method for notifying notifees of publications, one embodiment of the invention includes at least the acts of: identifying a publication; obtaining notification information pertaining to a notifor; identifying a notifee that is to be notified of the publication based on the notification information for the notifor; preparing a notification message; and transmitting the notification message to the notifee.

As a computer-implemented method for a notification system that notifies notifees of publications, one embodiment of the invention includes at least the acts of: identifying a publication; determining whether the publication is associated with a notifor that has previously provided notification information, including at least notification criteria and notifee information to the notification system for notifications with respect to at least those publications associated with the notifor; and transmitting a first message to the notifor inviting the notifor to participate with the notification system when it is determined that the notifor has not previously provided notification information to the notification system. When it is determined that the notifor has previously provided notification information to the notification system, the embodiment of the invention further includes at least the acts of: identifying a notifee that is to be notified of the publication based on the notifee information; preparing a notification message; and transmitting the notification message to the notifee.

As a notification system, one embodiment of the invention includes at least a database for storing notification send criteria and notification sent data, and a notification server operatively connected to the database. The notification server operates to automatically send notifications of publications that satisfy the notification send criteria and to create the notification sent data pertaining to the notifications of publications.

As a computer readable medium including at least computer program code for notifying notifees of publications, one embodiment of the invention includes at least: computer program code for identifying a publication matching predetermined notification criteria; computer program code for identifying an appropriate notifee to be notified of the publication matching predetermined notification criteria; computer program code for preparing a notification message; and computer program code for sending the notification message to the appropriate notifee.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

The invention relates to notifying others of publications. These improved approaches enable notifications to be timely and reliably made. In one embodiment, a notifor requests notification of certain publications be performed in an automated and controlled manner, and then notifications for such certain publications are automatically prepared and electronically transmitted to one or more notifees.

Embodiments of this aspect of the invention are discussed below with reference to FIGS. 1-7. However, those skilled in the art will readily appreciate that the detailed description given herein with respect to these figures is for explanatory purposes as the invention extends beyond these limited embodiments.

Figure 1:
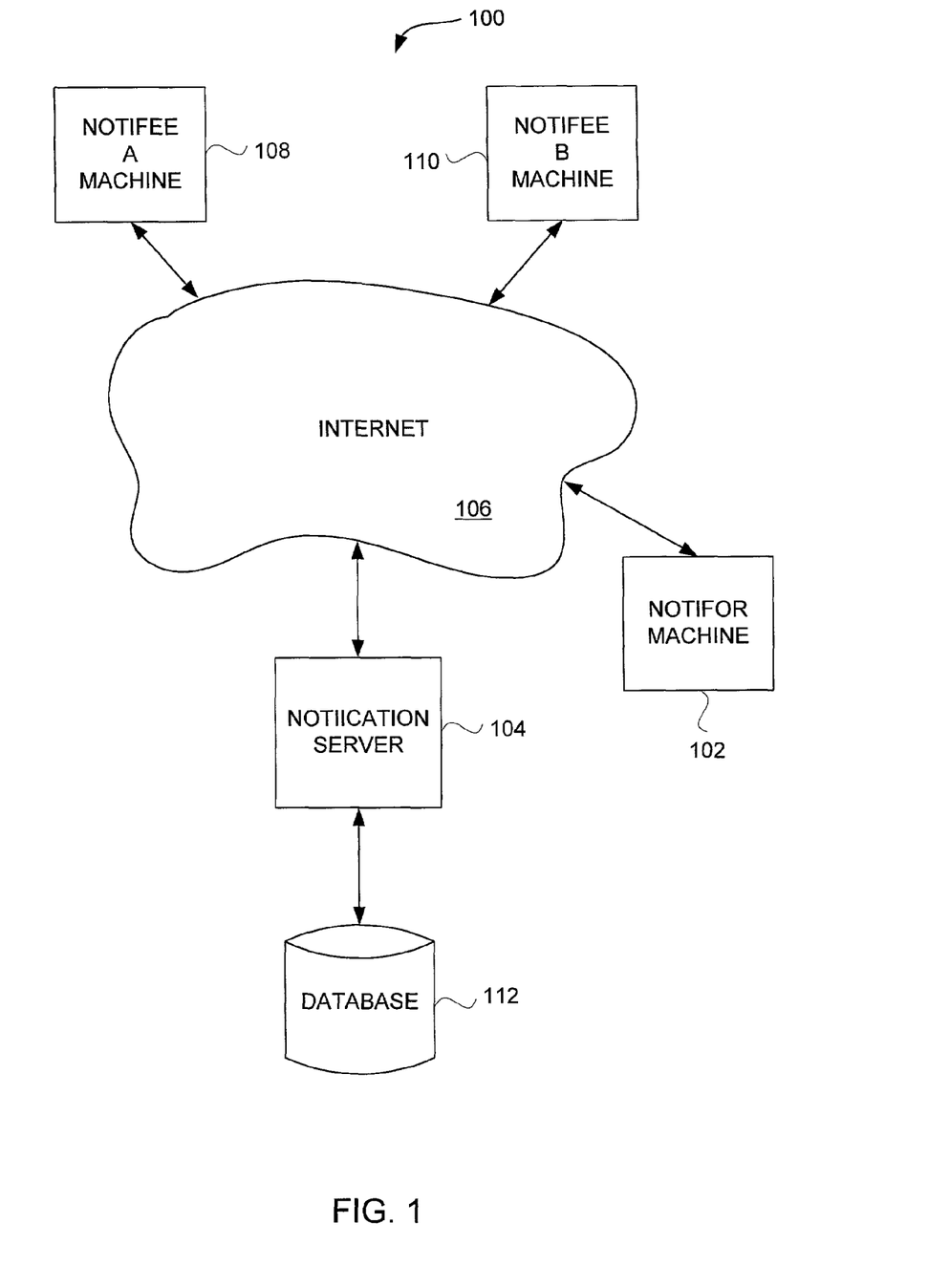
FIG. 1 is a block diagram of a notification system according to one embodiment of the invention.

FIG. 1 is a block diagram of a notification system 100 according to one embodiment of the invention. The notification system 100 includes a notifor machine 102 that interacts with a notification server 104 through the Internet 106. The Internet 106 is a network of interconnected computers. The notifor machine 102 is a computing device that couples to the Internet 106. In one embodiment, the notifor machine 102 couples to the Internet 106 through an Internet Service Provider (ISP). The notification server 104 also couples to the Internet 106. The notification server 104 is a computer system, referred to as a server or web server.

The notification system 100 also includes a notifee A machine 108 and a notifee B machine 110. The notifee machines 108 and 110 are computing devices that couple to the Internet 106. The notification system 100 operates to automatically notify one or more notifees via the notifee machines 108 and 110. The notification server 104 provides such notifications to the appropriate notifees based on instructions provided by the notifor machine 102 to the notification server 104. The notification server 104 also interacts with a database 112 such that the automatic notifications can be sent to the appropriate notifees. Typically, the notifications to particular notifees are requested by particular notifors.

Although the notification system 100 uses the Internet 106 to provide data transfer, it should be understood that other data networks (wired or wireless) can likewise be used. The data transfer can also be achieved through various different interconnected networks.

Figure 2:
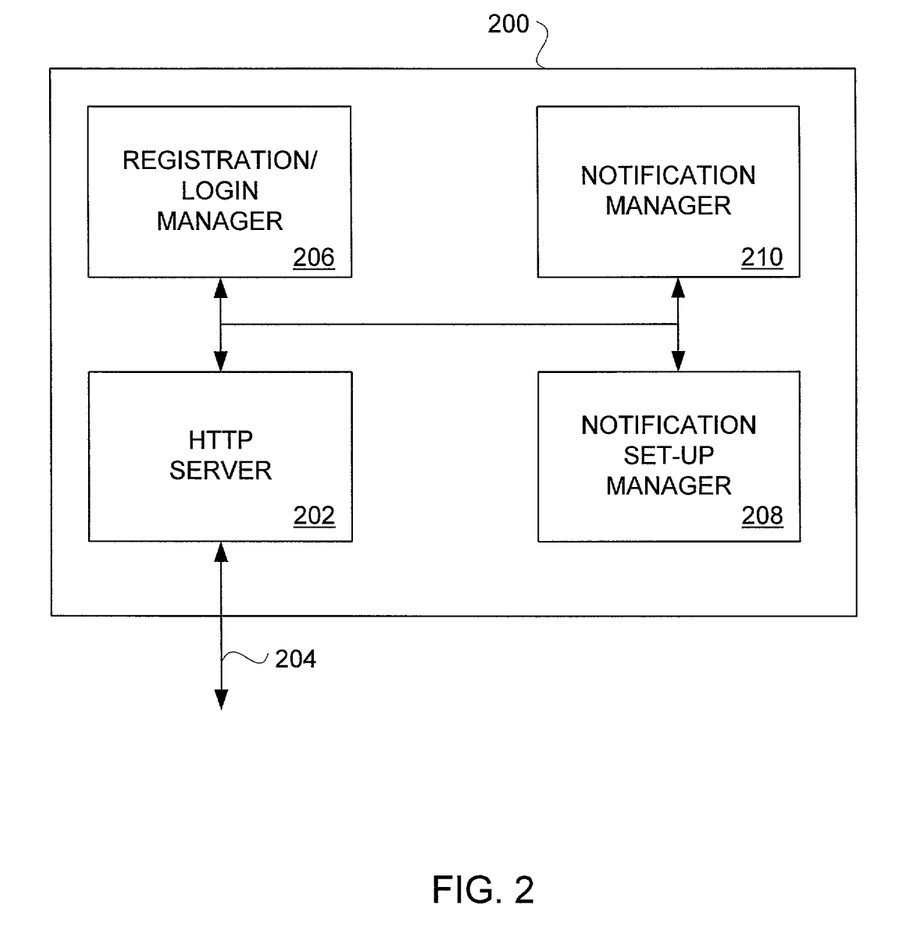
FIG. 2 is a block diagram of a notification server according to one embodiment of the invention.

FIG. 2 is a block diagram of a notification server 200 according to one embodiment of the invention. The notification server 200 is, for example, a representative detailed embodiment of the notification server 104 illustrated in FIG. 1.

The notification server 200 includes an HTTP server 202 that couples to a network (e.g., the Internet 106) via a communication link 204. The HTTP server 202 can interact with a registration/log-in manager 206, a notification set-up manager 208, and a notification manager 210. The registration/log-in manager 206 operates to facilitate either the registration or log-in of a particular user to the notification system. The user can, for example, be a notifor or a notifee. The notification set-up manager 208 is primarily utilized by a notifor to set up the particular types of notifications they desire to automatically deliver to particular notifees. The notification manager 210 operates to identify when and what notifications need to be delivered and then operates to deliver the notifications to appropriate notifees.

In one embodiment, the notifications pertain to certain publications. Notifors often desire to have notifees informed of such publications. Thus, the notification system can automatically notify notifees of publications (e.g., often the publications are associated with the notifors). The notification system documents the notifications and provides historical or archive type storage for prior notifications. Typically, the registration/log-in manager 206, the notification set-up manager 208, and the notification manager 210 store data to and retrieve data from a database (database 112 in FIG. 1).

Figure 3:
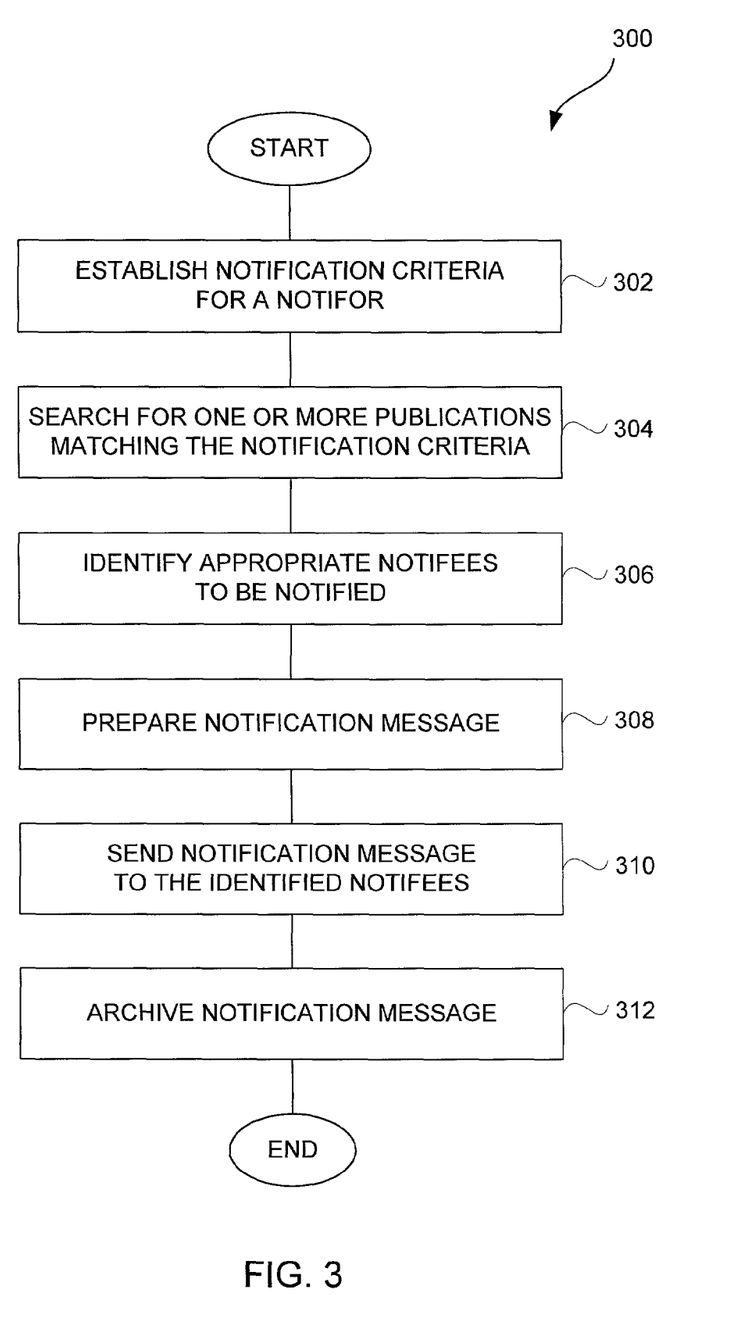
FIG. 3 is a flow diagram of basic notification processing according to one embodiment of the invention.

FIG. 3 is a flow diagram of basic notification processing 300 according to one embodiment of the invention. The basic notification processing 300 is, for example, performed by the notification server 104 illustrated in FIG. 1 or the notification server 200 illustrated in FIG. 2.

The basic notification processing 300 initially establishes 302 notification criteria for a notifor. The notification criteria, for example, identifies particular notifees or categories of industry that are to be notified when particular documents become published. Examples of categories of industry are: computer manufacturers; microprocessor companies; integrated circuit processing equipment companies; disk drive manufacturers; toy companies; bicycle manufacturers; semiconductor memory companies; oil companies; pharmaceutical companies; etc. The categories of industry can be predetermined or can be provided or established by a notifor.

Next, a search 304 is performed to identify one or more publications that match the notification criteria. For example, in one embodiment, the notification criteria might indicate that certain published U.S. patent applications of the notifor are to be selected. After the one or more publications that match the notification criteria have been identified, appropriate notifees to be notified are identified 306. Typically, the notification criteria also indicates, or can be used to identify, the appropriate notifees. The appropriate notifees can be specific businesses or entities, can be specific individuals of businesses or entities, or can be those businesses or entities (or specific individuals therein) within an industrial group (category of industry). In general, the appropriate notifees can be specifically identified or can be associated with a selected category of industry. For example, if one or more categories of industry are indicated in the notification criteria, then the appropriate notifees can include those companies (namely, identified representatives therefor) associated with the one or more categories of industry.

After the appropriate notifees have been identified 306, a notification message is prepared 308. The notification message that is prepared 308 can be the same or can be different for the different ones of the appropriate notifees. In one embodiment, the type of notification message can be selected by the requesting notifor. In any case, assuming that the notification message is substantially the same for each of the appropriate notifees (which need not be the case), the notification message is then sent 310 to the identified notifees.

After the notification message has been sent, the notification message can be archived 312. By archiving the notification message, the notification server can log the sending of the message to the appropriate notifees such that the information regarding the sending of the notification messages (and optionally their receipt) can be subsequently retrieved. This provides a means to later prove that a notification message was sent and/or received.

Figure 4A:
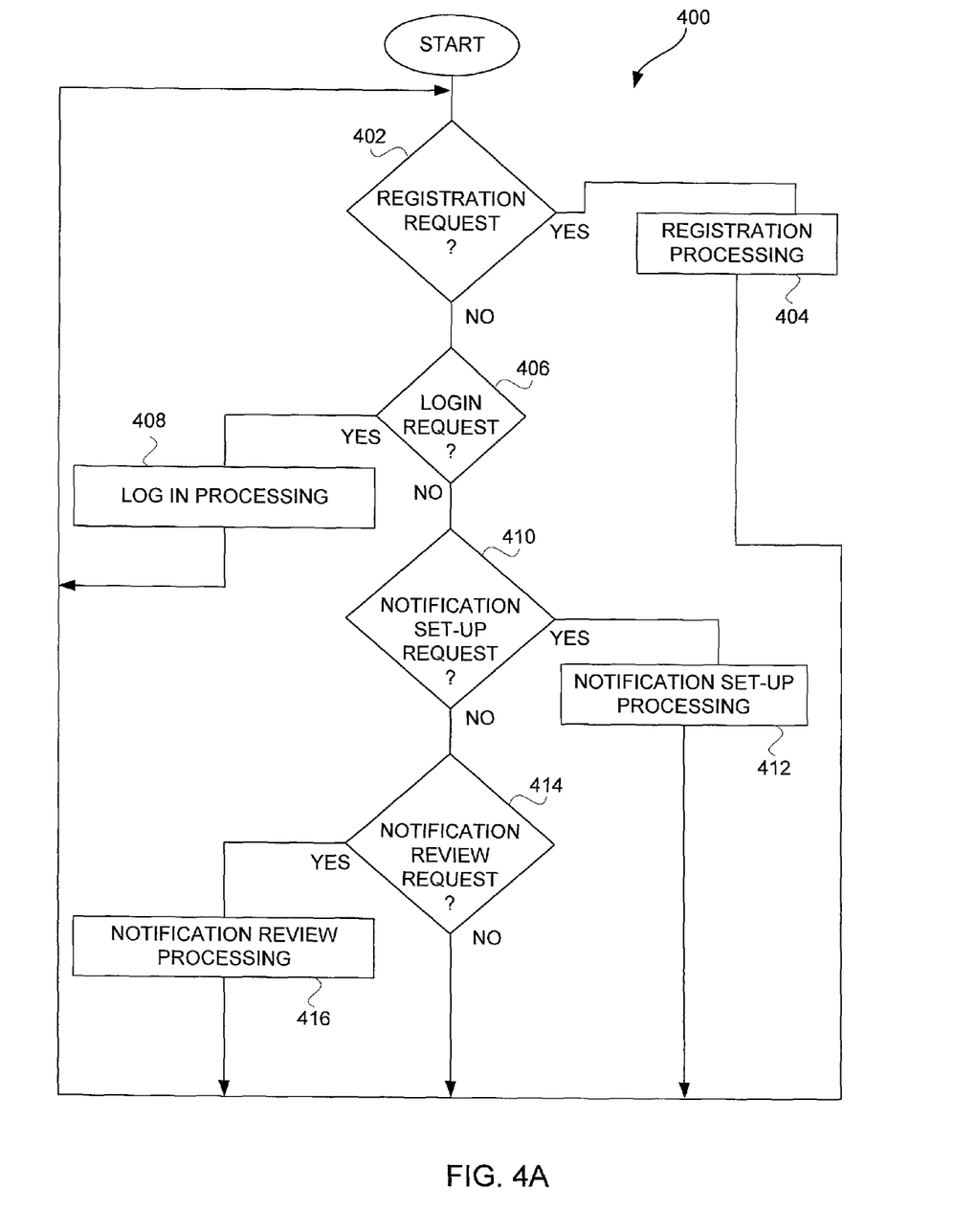
FIG. 4A is a flow diagram of notification management processing according to one embodiment of the invention.

FIG. 4A is a flow diagram of notification management processing 400 according to one embodiment of the invention. The notification management processing 400 is, for example, performed by the notification server 104 illustrated in FIG. 1 or the notification server 200 illustrated in FIG. 2.

The notification management processing 400 begins with a decision 402 that determines whether a registration request has been received. Here, the notification server can receive various types of requests from users (e.g., notifors). When a decision 402 determines that a registration request has been received, a registration processing 404 is performed. On the other hand, when the decision 402 determines that a registration request has not been received, then a decision 406 determines whether a login request has been received. When the decision 406 determines that a login request has been received, then login processing 408 is performed.

Alternatively, when the decision 406 determines that a login request has not been received, then a decision 410 determines whether a notification set-up request has been received. When the decision 410 determines that a notification set-up request has been received, then notification set-up processing 412 is performed. Alternatively, when the decision 410 determines that a notification set-up request has not been received, then a decision 414 determines whether a notification review request has been received. When the decision 414 determines that a notification review request has been received, then notification review processing 416 is performed.

Following the decision 414 when a notification review request has not been received, as well as following the operations 404, 408, 412 and 416, the notification management processing 400 then returns to repeat the decision 402 and subsequent operations so that the notification server is continuously available to receive various different requests and process those requests as required.

Figure 4B:
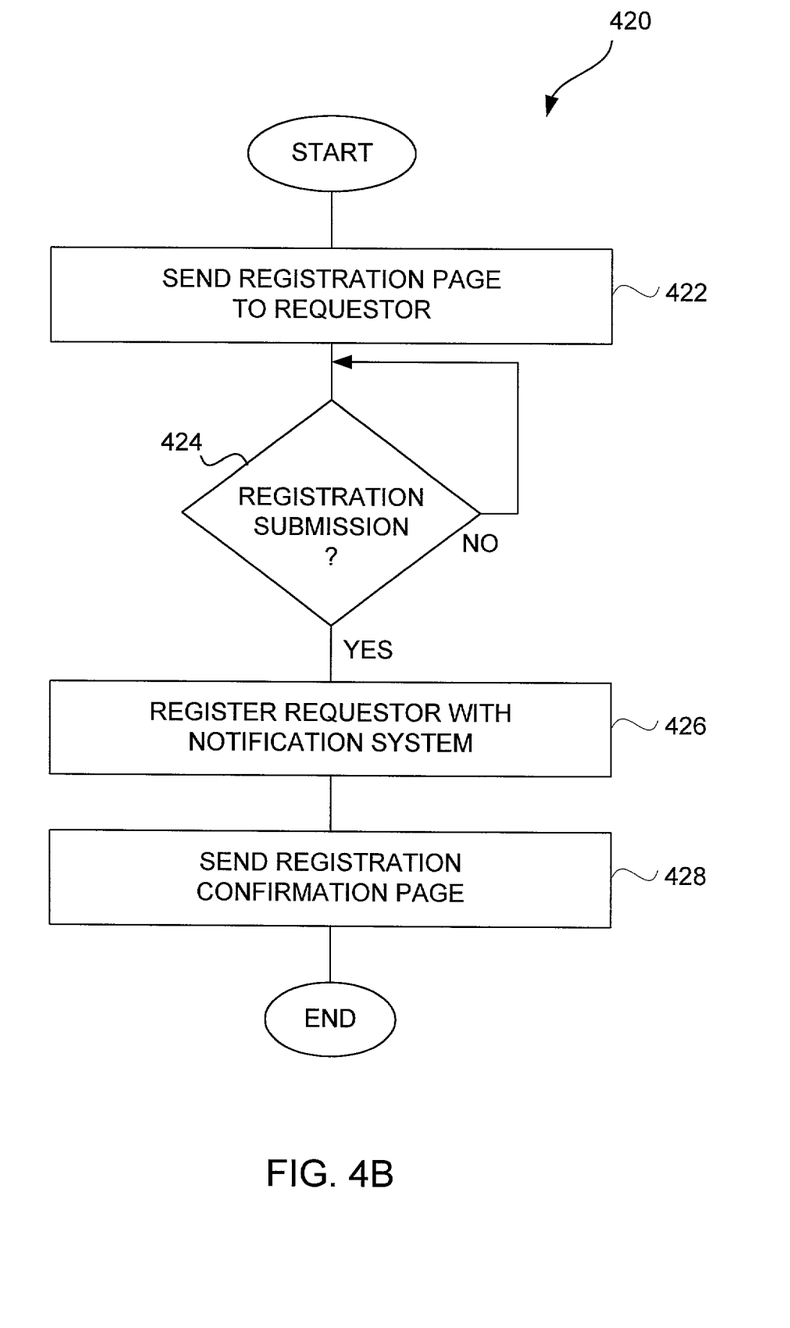
FIG. 4B is a flow diagram of registration processing according to one embodiment of the invention.

FIG. 4B is a flow diagram of registration processing 420 according to one embodiment of the invention. The registration processing 420 details the operations performed by the registration processing 404 illustrated in FIG. 4A.

The registration processing 420 initially sends 422 a registration page to a requestor. The requestor is, for example, a notifor or a notifee seeking to register for use of the notification system. Then, a decision 424 determines whether a registration submission has been received. When a decision 424 determines that a registration submission has not yet been received, the decision 424 causes the registration processing 420 to await such a submission. Once the decision 424 determines that a registration submission has been received, the requestor is registered 426 with the notification system. After the requestor has been registered 426 with the notification system, a registration confirmation page is sent 428 to the requestor. Following the operation 428, a registration processing 420 is complete and ends.

Figure 4C:
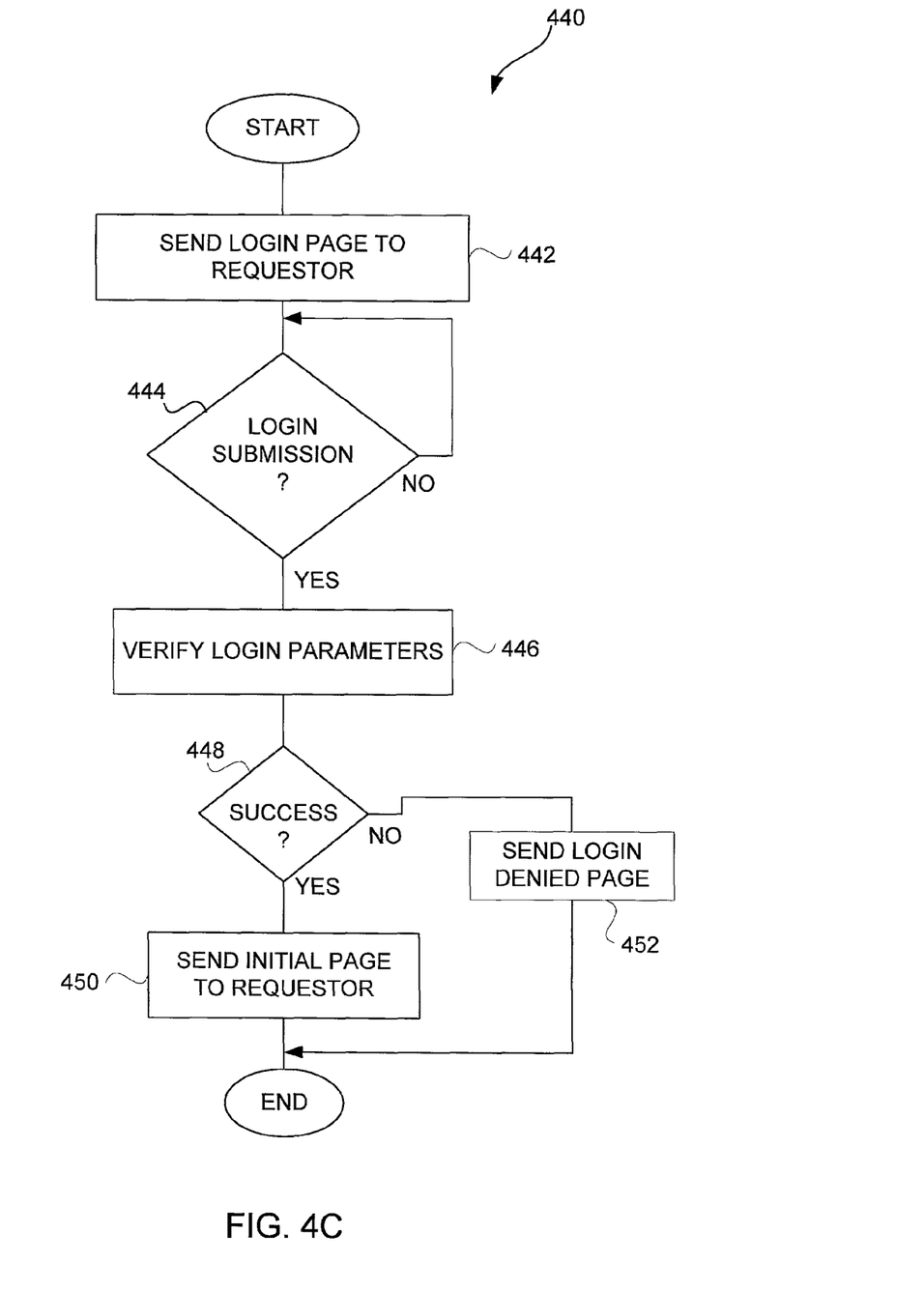
FIG. 4C is a flow diagram of login processing according to one embodiment of the invention.

FIG. 4C is a flow diagram of login processing 440 according to one embodiment of the invention. The login processing 440 details the operations performed by the login processing 408 illustrated in FIG. 4A.

The login processing 440 initially sends 442 a login page to a requestor. The requestor is, for example, a notifor or a notifee seeking to utilize the notification system. Then, a decision 444 determines whether a login submission has been received. When the decision 444 determines that a login submission has not yet been received, the login processing 440 awaits such a submission. Once the decision 444 determines that a login submission has been received, login parameters provided with the login submission are verified 446. Here, the login parameters are verified against previously stored information at the notification server. For example, login parameters might include a user name and password that are previously assigned and stored in a database associated with the notification server during a registration process. Hence, during the login verification, the login parameters provided with the login submission can be verified against the previously stored values within the database.

In any event, after the login parameters are verified 446, a decision 448 determines whether the login verification was successful. When the decision 448 determines that the login verification was successful, then an initial page is sent 450 to the requester, thereby providing the requestor with access to restricted areas (e.g., web pages) of the notification server. Alternatively, when the decision 448 determines that the login request was not successful, then a login denied page is sent 452 to the requester. Following the operation 450 and the operation 452, the login processing 440 is complete and ends.

Figure 4D:
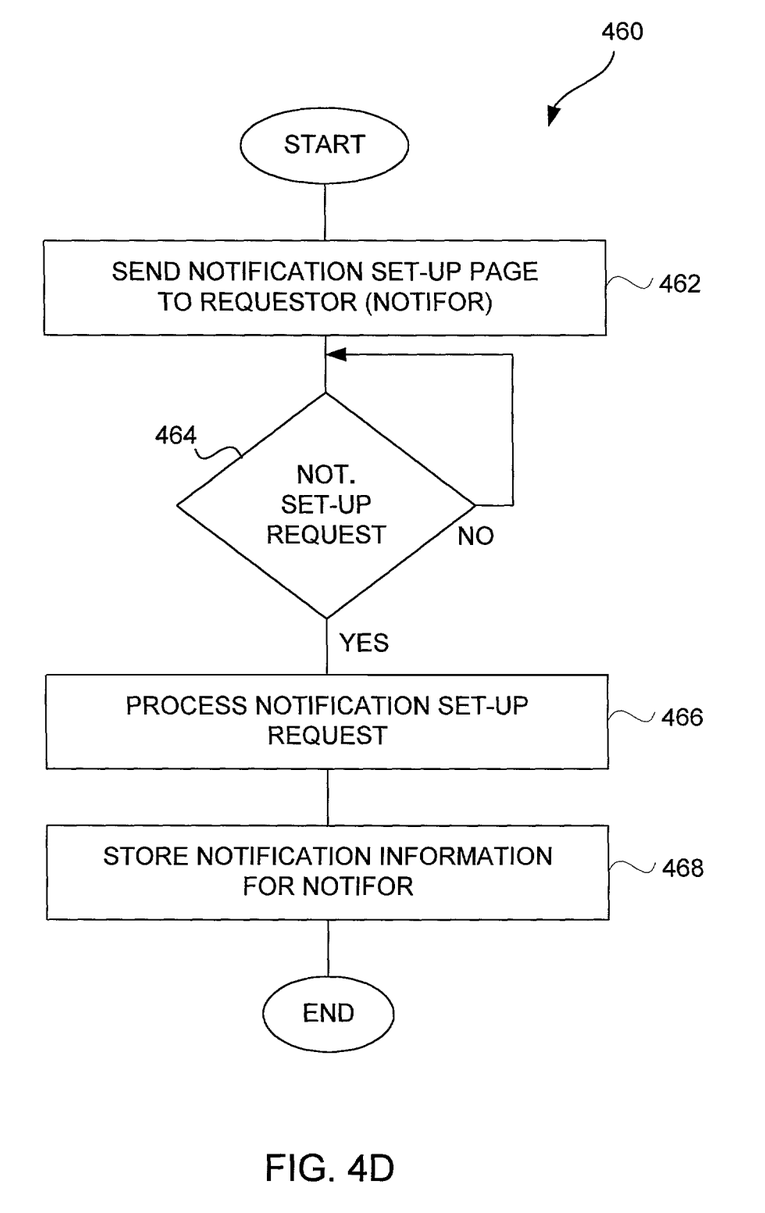
FIG. 4D is a flow diagram of notification set-up processing according to one embodiment of the invention.

FIG. 4D is a flow diagram of notification set-up processing 460 according to one embodiment of the invention. The notification set-up processing 460 details the operations performed by the notification set-up processing 412 illustrated in FIG. 4A. The notification set-up processing 460 assumes that the requester is already properly logged in.

The notification set-up processing 460 initially sends 462 a notification set-up page to a requestor. The requestor is a notifor that is setting up the notifications to be provided on their behalf by the notification system. Then, a decision 464 determines whether a notification set-up request has been received. When a decision 464 determines that a notification set-up request has not yet been received, the decision 464 causes the notification set-up processing 460 to await such a submission. Once the decision 464 determines that a notification set-up request has been received, the notification set-up request is processed 466 to acquire notification information. Thereafter, the notification information for the notifor can be stored 468. Typically, the notification information is stored in a database, such as the database 112 shown in FIG. 1. Following the operation 468, the notification set-up processing 460 is complete and ends.

Figure 4E:
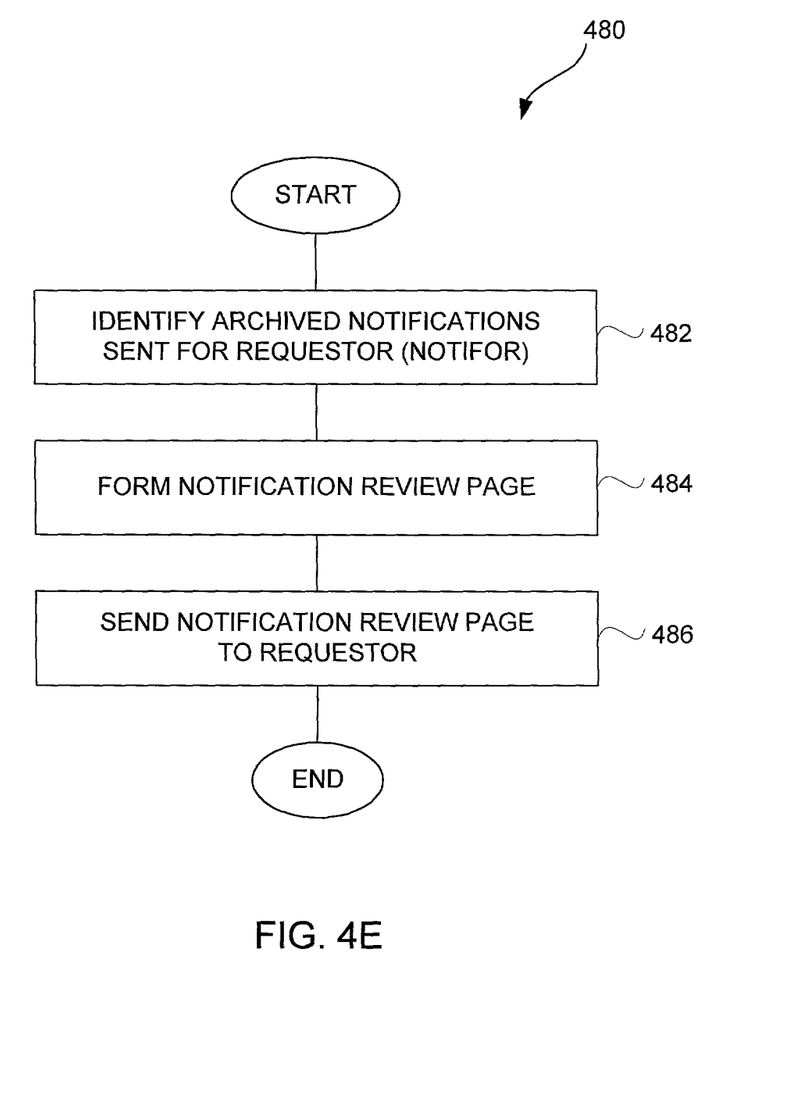
FIG. 4E is a flow diagram of notification review processing according to one embodiment of the invention.

FIG. 4E is a flow diagram of notification review processing 480 according to one embodiment of the invention. The notification review processing 480 details the operations performed by the notification review processing 416 illustrated in FIG. 4A. The notification review processing 480 assumes that the requestor is already properly logged in.

The notification review processing 480 initially identifies 482 archived notifications sent for the requester. The requestor is a notifor that is access the notification system to retrieve and view the notifications that have been provided by the notification system on their behalf. Typically, the archived notifications are retrieved from a database, such as the database 112 shown in FIG. 1. Next, a notification review page is formed 484. Then, the notification review page is sent 486 to the requester. Following the operation 484, the notification review processing 480 is complete and ends.

Figure 5:
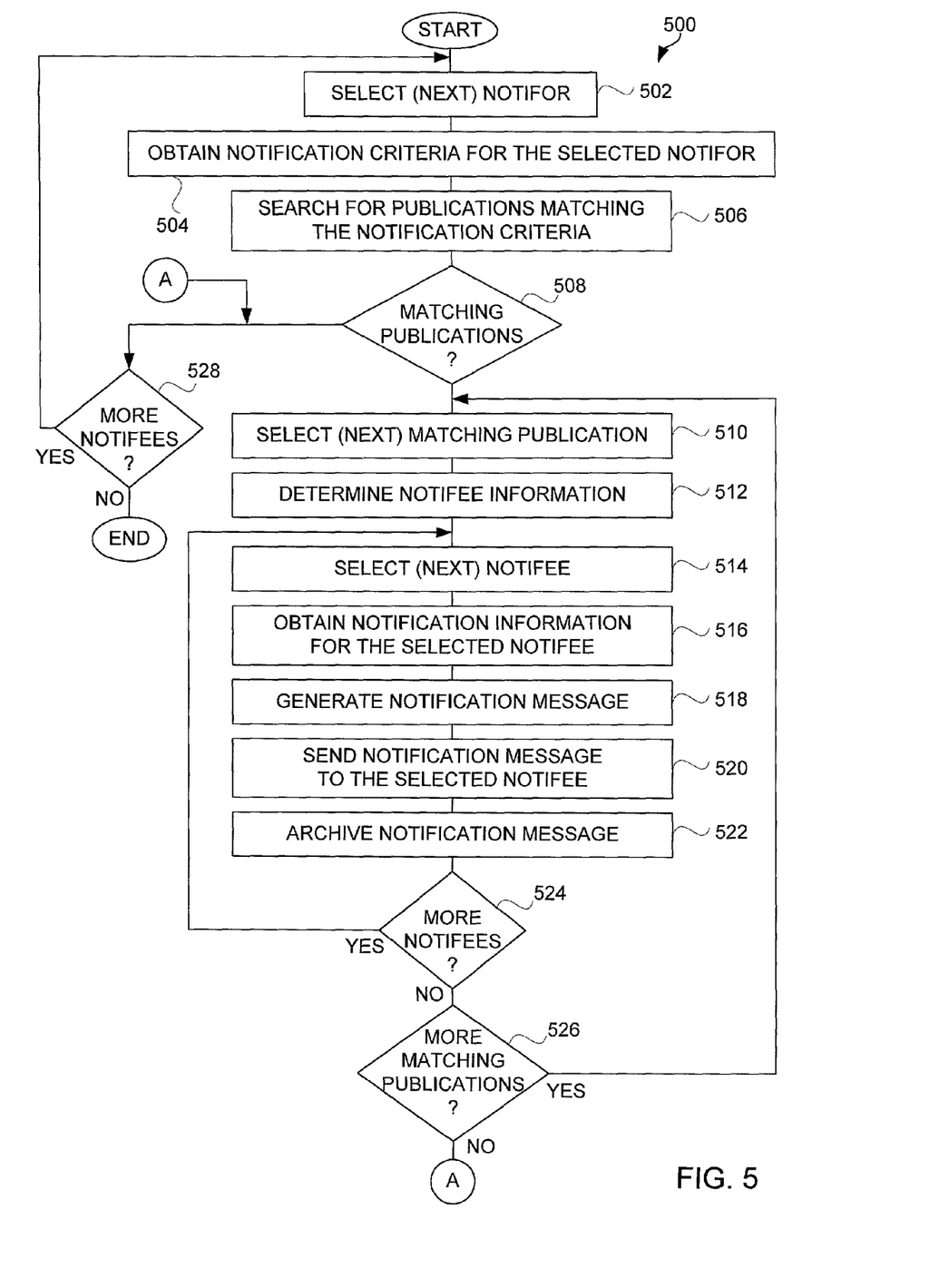
FIG. 5 is a flow diagram of detailed notification processing according to one embodiment of the invention.

FIG. 5 is a flow diagram of detailed notification processing 500 according to one embodiment of the invention. The detailed notification processing 500 is, for example, performed by the notification server 104 illustrated in FIG. 1 or the notification server 200 illustrated in FIG. 2. The detailed notification processing 500 can be performed periodically or after pertinent publication events.

The detailed notification processing 500 initially selects 502 a notifor. Then, notification criteria for the selected notifor is obtained 504. Then, a search 506 for those publications that match the notification criteria is performed. A decision 508 then determines whether one or more matching publications have been identified by the search 506. When the decision 508 determines that one or more matching publications have been identified, then a matching publication is selected

510. Then, notifee information is then determined 512. Among other things, the notifee information can identify one or more notifees that are to be notified with respect to a matching publication.

Next, one of the notifees is selected 514. After the notifee is selected 514, notification information for the selected notifee is obtained 516. As an example, the notification information for the selected notifee can indicate how the selected notifee is to be notified. For example, for the selected notifee, the notification information could provide the notification type, the electronic mail address, and name, title and associated organization. A notification message is then generated 518. Typically, the notification message that is generated 518 would be customized at least with respect to the information pertaining to the selected matching publication. As noted previously, different notifees can also receive different types of messages. The notification message is then sent 520 to the selected notifor. Typically, the notification information provides the electronic mail address of the selected notifee such that the notification message can be sent 520 electronically to the selected notifee as an electronic mail message. After the notification message has been sent 520, the notification message is archived 522. In one embodiment, the sent notification messages can be archived in a database associated with the notification server.

Next, a decision 524 determines whether there are more notifees that are to be notified with respect to the selected matching publication. When the decision 524 determines that there are more notifees to be notified, then the detailed notification processing 500 returns to repeat the operation 514 and subsequent operations for a next notifee.

Alternatively, when the decision 524 determines that there are no more notifees for the selected matching publications, a decision 526 determines whether there are more matching publications to be processed. When a decision 526 determines that there are more matching publications to be processed, the detailed notification processing 500 returns to repeat the operation 510 and subsequent operations for a next matching publication.

On the other hand, once the decision 526 determines that there are no more matching publications to be processed, the detailed notification processing 500 performs a decision 528. Additionally, when the decision 508 determines that there are no matching publications, the detailed notification processing 500 also performs the decision 528. In any case, the decision 528 determines whether there are more notifors to be processed. When the decision determines that there are more notifors to be processed, then the detailed notification processing 500 returns to repeat the operation 502 and subsequent operations so that other notifors can be similarly processed. However, once the decision 528 determines that there are no more notifors to be processed, the detail notification processing 500 is complete and ends.

Figure 6:
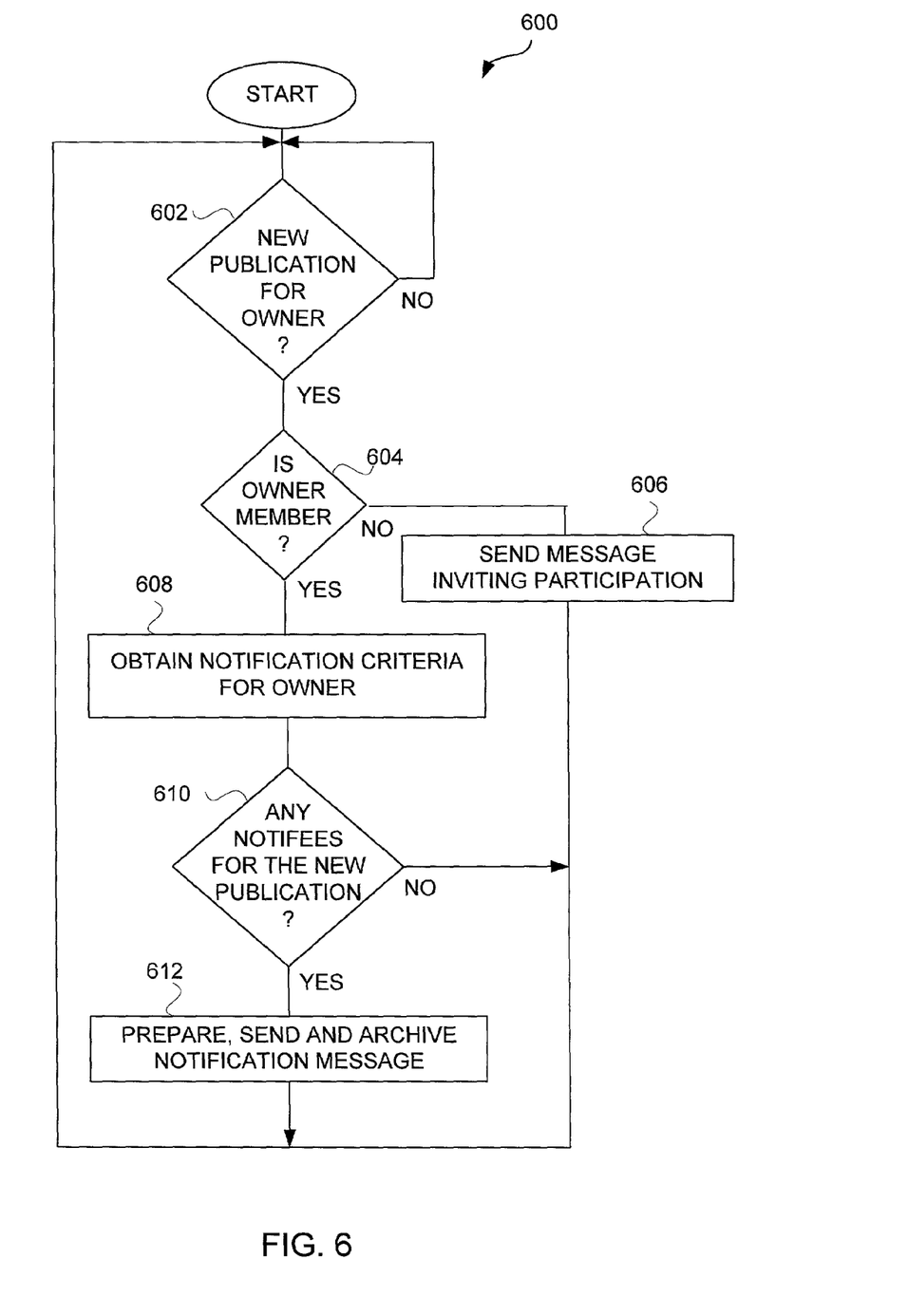
FIG. 6 is a flow diagram of notification processing according to one embodiment of the invention.

FIG. 6 is a flow diagram of notification processing 600 according to one embodiment of the invention. The notification processing 600 is, for example, performed by the notification server 104 illustrated in FIG. 1 or the notification server 200 illustrated in FIG. 2. The notification processing 600 can be performed periodically or after pertinent publication events.

The notification processing 600 begins with a decision 602 that determines whether a new publication for an owner is available. Owner refers, for example, to title holder, author or editor. When the decision 602 determines that a new publication is not available at this time, then the notification processing 600 awaits the availability of such a new publication. On the other hand, once the decision 602 determines that a new publication is available, the notification processing 600 continues. In effect, the notification processing 600 begins when a new publication becomes available.

When the notification processing 600 does continue, a decision 604 determines whether the owner of the publication is a member. Here, members are those businesses or individuals that are registered for notification service. In this embodiment, the owner has requested notification service of its publications. However, in general, third-party (i.e., non-owners) could also request notification service of publications of others in other embodiment. In any case, when the decision 604 determines that the owner is not a member, then the notification processing 600 can send 606 the owner a message inviting their utilization of the notification service. In one implementation, the message sent to the owner is an electronic mail message advising them of their new publication and offering to provide notification services.

Alternatively, when the decision 604 determines that the owner is a member, then the notification processing 600 obtains 608 notification criteria for the owner. The notification criteria specifies the criteria which determines which publication and which notifees are to be notified. In one embodiment, the notification criteria is obtained and stored through a registration or notification request process. Next, a decision 610 determines whether there are any notifees for the new publication. When the decision 610 determines that there are one or more notifees that are to be notified of the new publication, a notification message is prepared, sent and archived 612. On the other hand, when the decision 610 determines that there are no notifees, then the operation 613 can be bypassed. Following the operation 612 as well as the decision 610 when there are no notifees, the notification processing 600 returns to repeat the decision 602 and subsequent operations so that other new publications can be similarly processed.

The operation 612 of FIG. 6 can be implemented in a variety of ways. Typically, the message is an electronic message that is automatically prepared and electronically transmitted (i.e., electronic mail) to one or more notifees and then electronically archived. Documentation or evidence that the message was sent, delivered and confirmed can also be archived. The message can alternatively be electronically sent as a facsimile.

Figure 7:
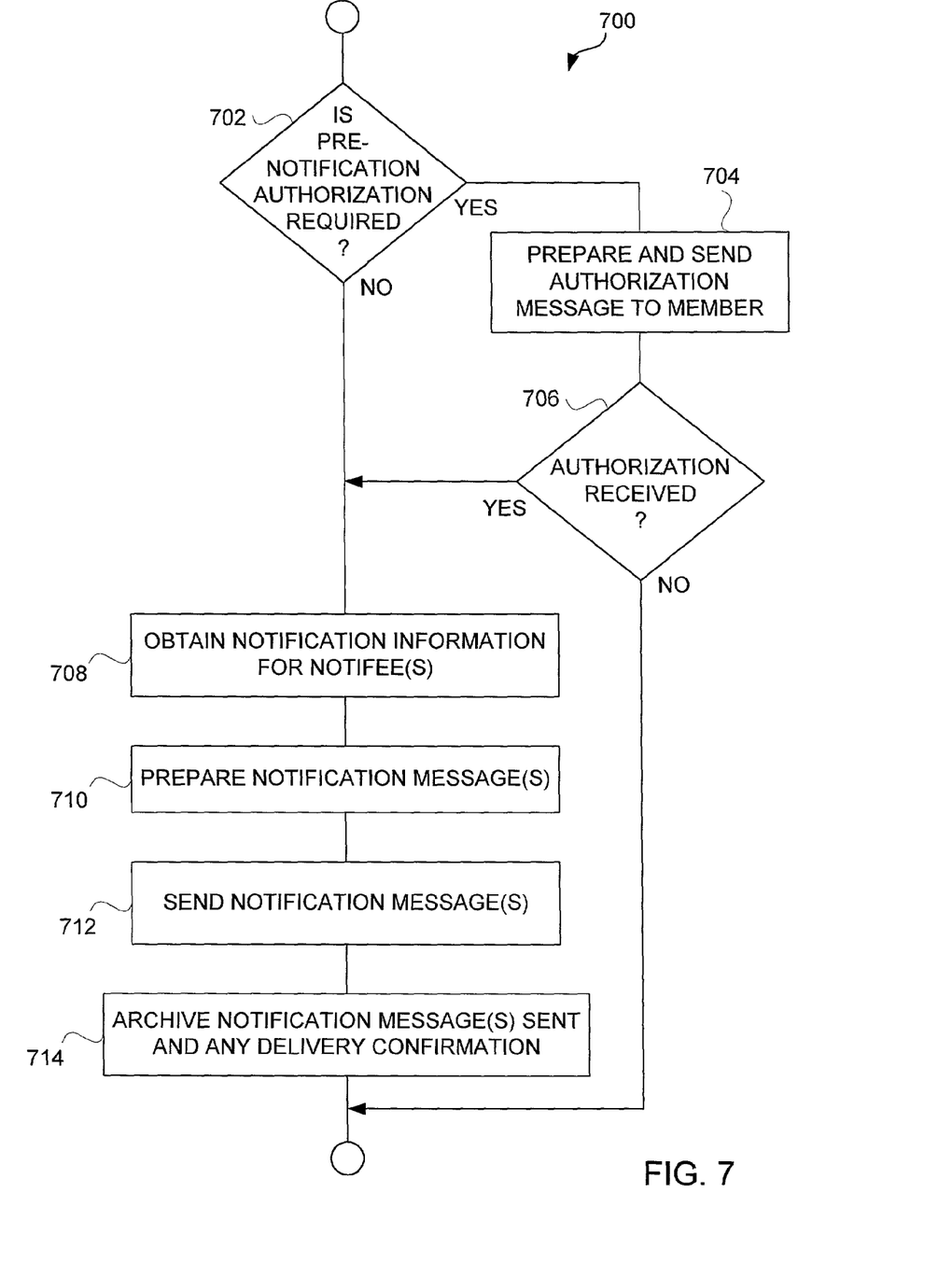
FIG. 7 is a flow diagram of notification message send processing according to one embodiment of the invention.

FIG. 7 is a flow diagram of notification message send processing 700 according to one embodiment of the invention. The notification message send processing 700 can, for example, represent processing associated with one embodiment of the operation 612 of FIG. 6. The notification message send processing 700 can be used in place of operations 516-522 of FIG. 5.

The notification message send processing 700 begins with a decision 702 that determines whether a pre-notification authorization is required. When the decision 702 determines that a pre-notification authorization is required, an authorization message is prepared and sent 704 to the member. Pre-notification authorization means that the notifor has requested (e.g., when registering) that the notifor be informed prior to sending out a notification message. Here, the authorization message permits the notifor to permit or decline the sending of the notification message to the notifee. The authorization can optionally also enable the notifor to preview the notification message before it is sent. Next, a decision 706 determines whether authorization has been is received. The authorization is, for example, a reply to the authorization message. In one implementation, the authorization message is an electronic mail message and the authorization is a reply to that electronic mail message. As another example, the authorization could be the notifor interacting with the notification server to provide the authorization. In one implementation, the electronic mail message could include a link (e.g., active link or hyperlink) to the notification server to facilitate the acquisition of the authorization. In any case, the authorization may take minutes, hours or days to be received following the sending the authorization message. Hence, the processing for this publication can wait for the authorization and then continue once received.

When the decision 706 determines that authorization has been received as well as following the decision 702 when no pre-authorization is required, notification information for the one or more notifees to receive the message is obtained 708. One or more notification messages are then prepared 710. Next, the one or more notification messages are sent 712. In one implementation, the notification messages are sent as electronic mail messages. In an alternative implementation, the notification messages can be sent as facsimiles. After the one or more notification messages are sent 712, the notification messages are archived 714. Additionally, any delivery confirmation can also be archived 714. For example, the delivery confirmation can be an indication that the notification message was received, an indication that the notification message was opened, or a reply to the notification message. Also, when the decision 706 determines that authorization is denied, then operations 708-714 are bypassed as notification message are not to be sent.

The notification messages utilized by the invention are generally predetermined but can also be customized by notifors. The different types of messages can provide notifors with an opportunity to use different messages in different situations. The notification messages can contain an active link to the publication. For example, the active line can be a hyperlink that, when selected, retrieves and displays the publication for the requestor (e.g., notifee). The notification messages can also contain active links to license information, an analysis of the publication in general or with respect to the notifee, or other documentation or presentations. The requesting notifor can be anonymous or identified in the notification messages.

The notification types can vary with implementation. In one embodiment, in which the publications are patent related, the notification types can include: (i) a mere patent information, (ii) patent information and license offer (non-aggressive), (iii) patent information and license offer (aggressive), and (iv) cease and desist infringement. Hence, the content or text of these notifications will vary with type. As an example, a notification of the "mere patent information" type might state the following:

You are hereby notified of U.S. Patent Application No. [x,xxx,xxx], which was published on [month, day, year], and thereby now enjoys provisional rights. The text of the published application can be obtained from various sources, including by selecting the following link to published application.

For Licensing opportunities, click here.

Here, this exemplary message includes not only the notification message to inform the recipient of the patent publication, but also optionally includes a hyperlink to the publication document and a hyperlink to access licensing information.

The invention provides notification of publications in an automated, computer-implemented way. The publications can be of various types. Some examples of particularly useful publications include published patent application and issued patents. The notification of these patent-related publications have legal consequences. Accordingly, the ability to affect notification in a reliable and automated way is a welcome advance to the state of the art.

The notification system according to one embodiment of the invention operates in a client-server environment. The clients are notifors or notifees, or their machines or network browsers operating on their machines. Typically, the notifor interacts with a network browser operating on a computing device to in turn interact with the notification server. The information provided to the notifor is then often a markup language document or page (e.g., web page). Notifees typically only need to access a computing device to receive electronic mail. The notifor may also need access to electronic mail.

The invention is preferably implemented in software, but can be implemented in hardware or a combination of hardware and software. The invention can also be embodied as computer readable code on a computer readable medium. The computer readable medium is any data storage device that can store data which can be thereafter be read by a computer system. Examples of the computer readable medium include read-only memory, random-access memory, CD-ROMs, magnetic tape, optical data storage devices, carrier waves. The computer readable medium can also be distributed over a network coupled computer systems so that the computer readable code is stored and executed in a distributed fashion.

The advantages of the invention are numerous. Different embodiments or implementations may yield one or more of the following advantages. One advantage of the invention is that notifications of publications can be efficiently scheduled and carried-out. Another advantage of the invention is that notifications that are performed are documented. Still another advantage of the invention is that it is network-based so that access is available whenever network access is available.

The many features and advantages of the present invention are apparent from the written description and, thus, it is intended by the appended claims to cover all such features and advantages of the invention. Further, since numerous modifications and changes will readily occur to those skilled in the art, the invention should not be deemed limited to the exact construction and operation as illustrated and described. Hence, all suitable modifications and equivalents may be resorted to as falling within the scope of the invention.

The invention claimed is:

1. A computer-implemented method for notifying notifees of publications, said method comprising:

obtaining, by a notifor through registration, predetermined notification information to be utilized in notifying one or more particular notifees, the predetermined notification information including predetermined notification criteria that serves to identify those publications of the notifor that are to be delivered to the one or more particular notifees, and the predetermined notification information further includes or serves to identify the one or more particular notifees other than the notifor as well as electronic mail addresses for the one or more particular notifees;

periodically and automatically determining whether a publication of the notifor matches the predetermined notification criteria;

determining, based on the predetermined notification criteria, an appropriate notifee to be notified of the publication matching the predetermined notification criteria, the appropriate notifee being one of the one or more particular notifees;

preparing a notification message if said determining determines that an appropriate notifee is to be notified of the publication matching the predetermined notification criteria, the notification message including or referencing the publication that matches the predetermined notification criteria; and initiating sending the notification message to the appropriate notifee if said determining determines that an appropriate notifee is to be notified of the publication matching the predetermined notification criteria, wherein said periodically and automatically determining, said determining, said preparing and said initiating sending are carried out using at least one server computer, wherein the notification message is an electronic notification message, wherein said sending is an electronic transmission of the electronic notification message, wherein the notification message is sent on behalf of the notifor, wherein said computer-implemented method comprises sending an authorization request message to the notifor, and wherein said initiating sending of the notification message is performed only after receiving from the notifor authorization for the notification message following said sending of the authorization request message to the notifor.

2. A computer-implemented method as recited in claim 1, wherein the publication is a published patent application or an issued patent that is associated with the notifor.

3. A computer-implemented method as recited in claim 2, wherein said method further comprises:
archiving the notification message.

4. A computer-implemented method as recited in claim 1, wherein the notification criteria serves to identify a plurality of appropriate notifees.

5. A computer-implemented method as recited in claim 1, wherein the notification criteria includes at least a notification type.

6. A computer-implemented method as recited in claim 1, wherein the notification criteria includes at least an authorization requirement that serves to authorize notification of the one or more particular notifees.

7. A computer-implemented method as recited in claim 1, wherein the notification message places the appropriate notifee on notice of the publication and documents the fact of such notification.

8. A computer-implemented method as recited in claim 1, wherein the notification message is an electronic notification message, and wherein the authorization message is an electronic authorization message.

9. A computer-implemented method as recited in claim 8, wherein the authorization message enables the notifor to authorize the notification message and to preview the notification message.

10. A computer-implemented method as recited in claim 1, wherein the notification criteria includes at least one category of industry that is used to identify the appropriate notifee.

11. A computer-implemented method for notifying notifees of publications, said method comprising:
obtaining, by a notifor through registration, notification information, the notification information including at least notification criteria and notifee information, the notifee information including at least one notifee other than the notifor;
identifying a publication to be processed for notifications;
determining whether the publication satisfies the notification criteria associated with the notifor;
obtaining notification information pertaining to the notifor when said determining determines that the publication satisfies the notification criteria associated with the notifor, the notification information identifying the at least one notifee other than the notifor to be notified of qualifying publications;
identifying a notifee that is to be notified of the publication based on the notification information pertaining to the notifor;
preparing a notification message including a reference to the entire publication; and
initiating transmission of the notification message to the notifee,
wherein said determining, said obtaining, said identifying, preparing and said initiating are carried out using at least one server computer,
wherein said computer-implemented method comprises sending an authorization request to the notifor, and
wherein said initiating transmission of the notification message is performed after authorization for the notification message is received in response to the authorization request.

12. A computer-implemented method as recited in claim 11, wherein the notifor is associated with the publication.

13. A computer-implemented method as recited in claim 11, wherein said initiating transmission comprises sending the notification message to the notifee as an electronic mail message.

14. A computer-implemented method as recited in claim 13, wherein the notification message informs the notifee of the publication and contains an active link to the publication.

15. A computer-implemented method as recited in claim 11, wherein said method further comprises:
archiving the notification message and its transmission to the notifee to permit subsequent access by the notifor.

16. A computer-implemented method as recited in claim 11, wherein the notification information includes a notification type, and wherein content of the notification message is dependent on the notification type.

17. A computer-implemented method as recited in claim 11, wherein the notifor provided the notification information through a registration process.

18. A computer-implemented method as recited in claim 11, wherein the publication is a published patent application or an issued patent.

19. A computer-implemented method as recited in claim 11, wherein the publication was recently published.

20. A computer-implemented method performed by a server for a notification system that notifies notifees of publications, said method comprising the acts of:
(a) identifying a publication;
(b) determining whether the publication is associated with a notifor that has previously provided notification information, including at least notification criteria and notifee information, to the notification system for notifications with respect to at least those publications associated with the notifor;
(c) transmitting a first message to the notifor inviting the notifor to participate with the notification system when said determining (b) determines that the notifor has not previously provided notification information to the notification system; and
(d) when said determining (b) determines that the notifor has previously provided notification information to the notification system, performing the acts of:
(d1) identifying a notifee that is to be notified of the publication based on the notifee information;

(d2) preparing a notification message; and (d3) transmitting the notification message to the notifee.

21. A computer-implemented method as recited in claim 20, wherein said transmitting (d3) comprises sending the notification message to the notifee as an electronic mail message.

22. A computer-implemented method as recited in claim 21, wherein the notification message informs the notifee of the publication and contains an active link to the publication.

23. A computer-implemented method as recited in claim 20, wherein the publication is a published patent application or an issued patent.

24. A notification system, comprising:

a database for storing notification send criteria and notification sent data; and a notification server operatively connected to said database, said notification server is configured to perform the operations of:

identifying a publication to be processed for notifications;

determining whether the publication is associated with a notifor that has previously provided notification information, including at least notification criteria and notifee information, to the notification system for notifications with respect to at least those publications associated with the notifor;

transmitting a first message to the notifor inviting the notifor to participate with the notification system when said determining determines that the notifor has not previously provided notification information to the notification system; and when said determining determines that the notifor has previously provided notification information to the notification system, performing the acts of: identifying a notifee that is to be notified of the publication based on the notifee information; preparing a notification message; and transmitting the notification message to the notifee.

25. A notification system as recited in claim 24, wherein the notification message is sent as an electronic mail message.

26. A notification system as recited in claim 24, wherein the notification message includes at least an active link to the publications.

27. A notification system as recited in claim 24, wherein the publications are published patent applications or issued patents.

28. A notification system as recited in claim 24, wherein said notification server comprises:

a notification set-up manager that manages the acquisition of the notification send criteria from notifors; and a notification manager that manages formation and the sending of the notifications of publications that satisfy the notification send criteria.

29. A non-transitory computer readable medium including at least executable computer program code stored thereon for notifying notifees of publications, said computer readable medium including at least:

computer program code for obtaining, by a notifor through registration, predetermined notification information to be utilized in notifying one or more particular notifees, the predetermined notification information includes notification criteria that serves to identify those publications of the notifor that are to be delivered to the one or more particular notifees, and the predetermined notification information further includes or serves to identify the one or more particular notifees other than the notifor as well as electronic mail addresses for the one or more particular notifees;

computer program code for automatically determining whether a publication of the notifor matches the predetermined notification criteria;

computer program code for determining, based on the predetermined notification criteria, an appropriate notifee to be notified of the publication matching the predetermined notification criteria, the appropriate notifee being one of the one or more particular notifees;

computer program code for preparing a notification message, the notification message including or referencing the publication matching the predetermined notification criteria; and computer program code for sending the notification message to the appropriate notifee if said computer program code for determining determines that an appropriate notifee is to be notified of the publication matching the predetermined notification criteria, wherein the notification message is an electronic notification message, wherein said computer program code for sending is an electronic transmission of the electronic notification message, wherein the notification message is sent on behalf of the notifor, wherein said computer readable medium comprises computer program code for sending an authorization request to the notifor, and wherein said computer program code for sending of the notification message is performed only after receiving from the notifor an indication of authorization for the notification message to be sent.

* * * * *